United States Patent
Chittattukara et al.

(10) Patent No.: US 10,954,431 B2
(45) Date of Patent: Mar. 23, 2021

(54) DEGRADABLE DIVERSION MATERIAL HAVING A UREA COMPOUND

(71) Applicant: HALLIBURTON ENERGY SERVICES, INC., Houston, TX (US)

(72) Inventors: Shoy George Chittattukara, Thrissur (IN); Vishwajit Manajirao Ghatge, Pune (IN); Mallikarjuna Shroff Rama, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/645,087

(22) PCT Filed: Oct. 3, 2017

(86) PCT No.: PCT/US2017/054907
§ 371 (c)(1),
(2) Date: Mar. 6, 2020

(87) PCT Pub. No.: WO2019/070241
PCT Pub. Date: Apr. 11, 2019

(65) Prior Publication Data
US 2020/0283677 A1 Sep. 10, 2020

(51) Int. Cl.
*E21B 43/26* (2006.01)
*C09K 8/70* (2006.01)
(Continued)

(52) U.S. Cl.
CPC .............. *C09K 8/70* (2013.01); *C09K 8/426* (2013.01); *C09K 8/68* (2013.01); *C09K 8/80* (2013.01);
(Continued)

(58) Field of Classification Search
None
See application file for complete search history.

(56) References Cited

U.S. PATENT DOCUMENTS 4,662,448 A  5/1987 Ashford et al.
7,096,947 B2  8/2006 Todd et al.
(Continued)

FOREIGN PATENT DOCUMENTS

WO  WO 2016/115344  *  7/2016  ............. C09K 8/524

OTHER PUBLICATIONS

Elaine I. Pereira et al.; "Urea-Montmorillonite-Extruded Nanocomposite: A Novel Slow-Release Material"; Journal of Agricultural and Food Chemistry; 2012, 60 (21), 2012, 60 (21), pp. 5267-5272.
(Continued)

*Primary Examiner* — Andrew Sue-Ako
(74) *Attorney, Agent, or Firm* — Polsinelli PC

(57) ABSTRACT

Disclosed herein is a degradable diverter material having a urea compound. In particular, the degradable diverter material may be a particulate with each individual particle being a nanocompo site of a urea compound and clay. The degradable diverter material may be introduced into a wellbore penetrating a subterranean formation. The degradable diverter material may then be allowed to divert at least a portion of fluid present downhole, the fluid being introduced from the surface or already present dowhole. The degradable diverter material can then be allowed to at least partially degrade.

20 Claims, 5 Drawing Sheets

(a)

(b)

After dissolution of urea in aqueous Phase ⟶

(c)

● ⟶ Clay
○ ⟶ Urea

(51) Int. Cl.
*C09K 8/42* (2006.01)
*C09K 8/68* (2006.01)
*E21B 33/138* (2006.01)
*C09K 8/80* (2006.01)

(52) U.S. Cl.
CPC ............ *E21B 33/138* (2013.01); *E21B 43/26* (2013.01); *C09K 2208/10* (2013.01); *C09K 2208/26* (2013.01)

(56) References Cited

U.S. PATENT DOCUMENTS

| | | |
|---|---|---|
| 7,775,278 B2 | 8/2010 | Willberg et al. |
| 2008/0135251 A1 | 6/2008 | Nguyen et al. |
| 2009/0023613 A1* | 1/2009 | Li .......................... C09K 8/528 |
| | | 507/211 |
| 2009/0029878 A1 | 1/2009 | Bicerano |
| 2009/0305044 A1 | 12/2009 | Bicerano et al. |
| 2013/0098613 A1* | 4/2013 | Rose ...................... C09K 8/506 |
| | | 166/281 |
| 2015/0041131 A1* | 2/2015 | Brooks ................... C09K 8/56 |
| | | 166/279 |

OTHER PUBLICATIONS

Siafu Ibahati Sempeho, et al.; "Encapsulated Urea-Kaolinite Nanocomposite for Controlled Release Fertilizer Formulations"; Journal of Chemistry; vol. 2015, Article ID 237397, 17 Pages.
International Search Report and Written Opinion; PCT Application No. PCT/US2017/054907; dated Jun. 14, 2018.

* cited by examiner

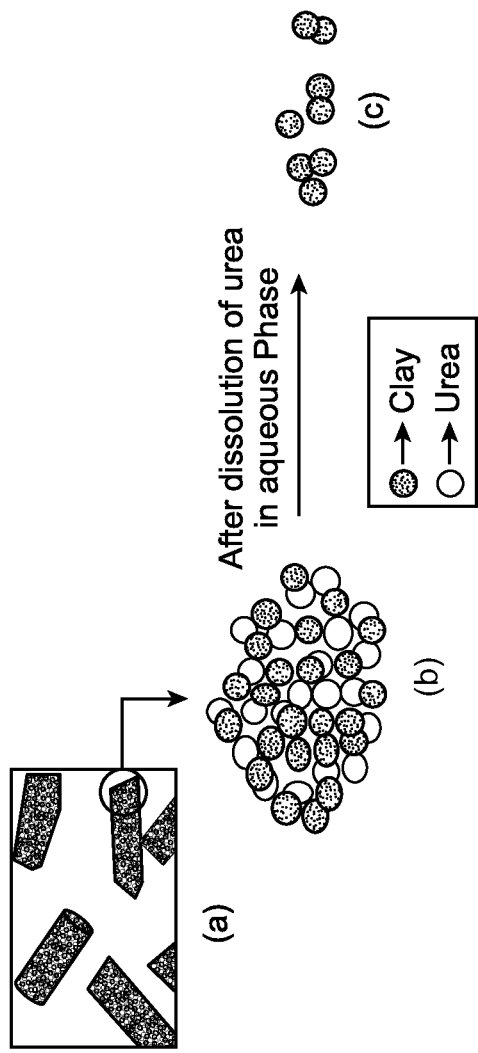
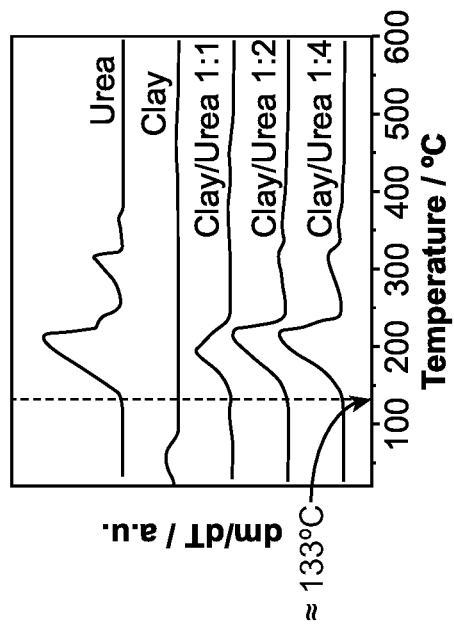
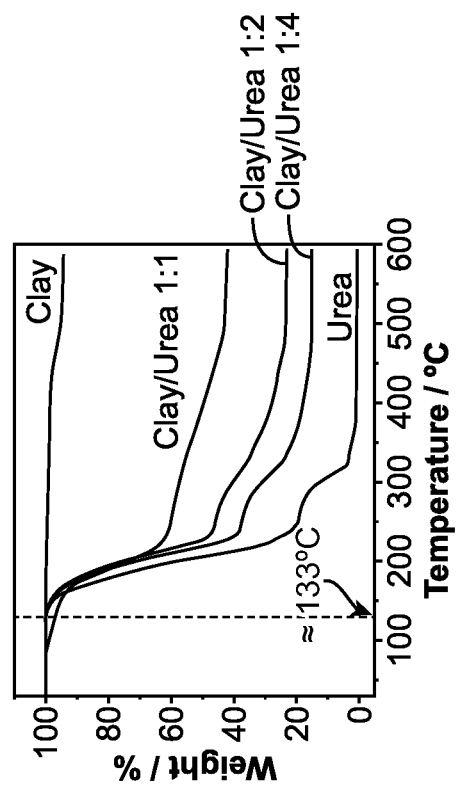
FIG. 1
FIG. 2a
FIG. 2b

DEGRADABLE DIVERSION MATERIAL HAVING A UREA COMPOUND

CROSS-REFERENCE TO RELATED APPLICATIONS

This application is a national stage entry of PCT/US2017/054907 filed Oct. 3, 2017, said application is expressly incorporated herein in its entirety.

FIELD

The present disclosure relates to degradable diversion material for use in subterranean regions.

BACKGROUND

During various stages in the development, stimulation and production of hydrocarbons it is often necessary to control the flow of various subterranean fluids. Accordingly, diversion materials are often introduced downhole to reach various subterranean locations to affect the flow of fluids. The diversion materials can prevent the flow of fluids to unwanted locations, divert flow to desirable locations, or prevent the loss of fluids from desired subterranean zones, among other functions. Additionally, after diverting fluid flow, it may be desirable to remove the diverting material from the well, either to permit flow again, or to prevent harm to the environment or wellbore, and accordingly degradable diverting material has been used.

One of the more common oil and gas processes includes hydraulic fracturing. In a typical hydraulic fracturing treatment, a treatment fluid often referred to as a "fracturing fluid" is pumped through a wellbore and into a subterranean formation producing zone at a rate and pressure such that one or more fractures are formed or extended into the zone. The fracturing fluid can include proppants which are introduced into the fractures.

BRIEF DESCRIPTION OF THE DRAWINGS

Implementations of the present technology will now be described, by way of example only, with reference to the attached figures, wherein:

FIG. 1 illustrates an example nanocomposite of a urea compound and clay;

FIG. 2 is a graph illustrating thermogravimetric and derivative thermogravimetric curves for an example nanocomposite disclosed herein;

DETAILED DESCRIPTION

Figure 3:
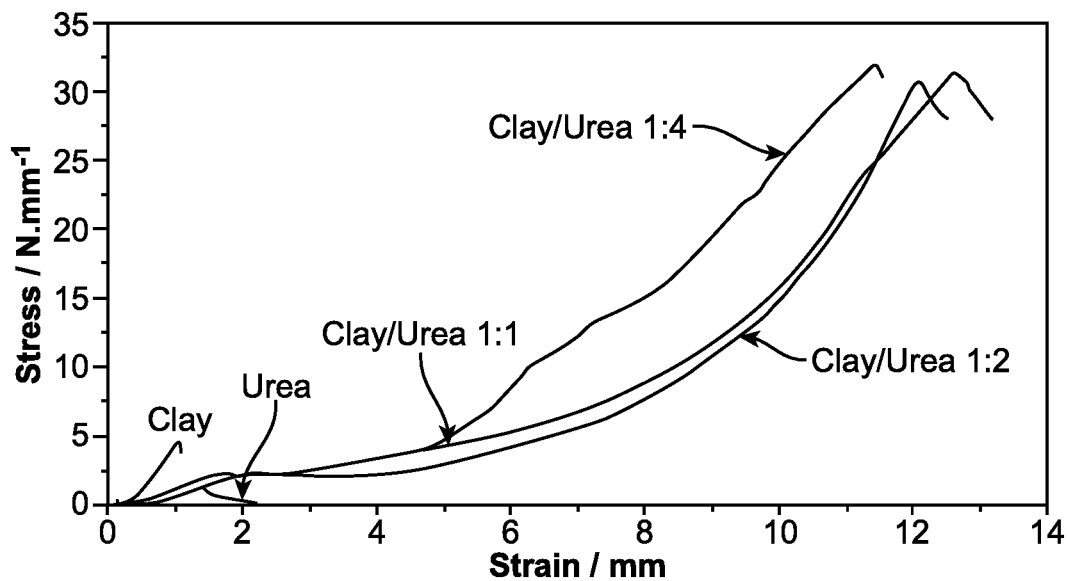
FIG. 3 is a graph illustrating a compression test of an example nanocomposite disclosed herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

In the following discussion and in the claims, the terms "including" and "comprising" are used in an open-ended fashion, and thus should be interpreted to mean "including, but not limited to . . . ". As used herein, the term "derivative" refers to any compound that is made from a parent compound, for example, by replacing one atom in one of the listed compounds with another atom or group of atoms, adding substituents, ionizing one of the listed compounds, or creating a salt of one of the listed compounds.

Brief Overview

Disclosed herein is a cost effective, non-toxic and eco-friendly degradable diverter material. In particular, the degradable diverter material m provided in particulate form and may be mixed with a carrier fluid to form a slurry and injected down a wellbore. The degradable diverter material proceeds to one or more perforations or fractures in a wellbore and diverts the flow of fluids. Diversion herein may include any full or partial obstruction or redirection of fluid in a subterranean region, including the wellbore, fraction or formation. The diversion material may agglomerate together to form a barrier or obstruction for fluid. For instance, the diversion material may form a plug in any one of a perforation, fracture, or the wellbore. The diversion material may also form a filter cake along the surface of the formation for instance in one or more of the fractures. Accordingly, whether forming a plug or a filter cake, or other obstruction, the diversion material acts to divert fluid downhole.

The fluid may be any type of fluid present in a subterranean region. This fluid may include treatment fluid injected into the wellbore from the surface, including the carrier fluid, or from nearby wellbores. The fluid may also have been already present downhole as subterranean fluid.

The diverter material includes a urea compound, such as urea or a urea derivative. Urea has high soluble in water and therefore may degrade while downhole in the presence of water, and therefore may degraded in the presence of any aqueous fluid. The degradable diverter material may be a combination of urea and clay. These may be combined into a composite, for instance a nanocomposite. While the urea is water soluble, the clay is water insoluble, and together the degradation of the composite may be controlled and delayed so as to release over a period of time, such as hours or days, including a predetermined time period desired by operators of the well. Additionally, an additive may be provided in the degradable diverter material to delay degradation. For instance, a polymer gelling agent may be added to the composite. The polymer gelling agent may swell in the presence of water and act as a barrier preventing or inhibiting contact of the urea with water.

As a result of degradation, the urea may flow to the surface dissolved in the aqueous downhole fluid. Furthermore, as a result of degradation of the composite, the clay as a individual particles may flow back to the surface or may serve as proppant in one or more microfracures or fractures.

Degradable Diverter Material

As mentioned the degradable diverter material may include a urea compound. The urea compound may be any urea compound which is soluble or at least partially soluble in water and may have the following formula I:

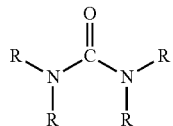

Wherein each R, independently from one another, may be hydrogen, a straight, branched or cyclic alkyl group having from 1-20 carbon atoms, aryl, alcohol, ether, ester, or any O containing group, or a heterocyclic group containing one or more O or N.

The urea compound may be urea, wherein each R is H, shown in the following compound 1a:

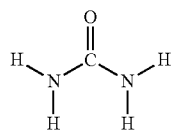

For the purposes of this disclosure, when one or more of the R's are not H, this may be referred to as a urea derivative.

The degradable diverter material may include a combination of urea and a clay. Clays include hydrated aluminosilicates, such as phyllosilicates, and may have a structure made up of sheets or layers of silicates, and may include various amounts of other alkali or alkaline metals or other transition metals such as iron. Any layered material is suitable including layered silicates, layered aluminosilicates, 1:1 layered aluminosilicates, 1:2 layered aluminosilicates, anionic and cationic clays, talc, synthetic clays like laponite, sepiolite, fluorosilicates as well as natural clays. Particular suitable clays include kaolin (also kaolinite) and montmorillonite.

The urea compound and the clay may be in the form of a composite, or nanocomposite. For instance the urea and clay may be a particulate, where each individual particle of the particulate is a nanocomposite of urea and clay. The urea and clay may each themselves be in the form of smaller particles, which combined together form larger particles which forms the degradable diverter material disclosed herein.

The particles of clay may form a matrix or structure which contain the particles or molecules of urea. While not held to any particular theory, it is believed that the clay is made up of a stacking of two-dimensional units, known as layers, which are bound together via weak forces. The particles or molecules of urea may be intercalated, i.e., introduced as a guest particle or molecule, into the host clay structure. In this manner the nanocomposite may be formed. While the layered material could be in an intercalated form with inclusion of urea and/or polymer molecules in between the layers, the material can also be in exfoliated form where layers are well separated and disoriented in the matrix of urea and polymer.

Nanocomposites may be prepared by grinding the clay and/or urea into small particles, and then mixing together. Water may be added to provide plasticity to the mixture. The material can then be extruded, for example with a twin-screw extruder (for instance at 35° C.), and converted to pellets or other shapes. The degradable diverter material may be particulate, and may be in the form of any shape, including finely divided particulate, beads, pellets, chips, powder, granules, flakes, fiber, any other shape, or mixtures thereof.

The size of the particulate depends on the application or process. As mentioned the particle size of the particulate may range from 30 µm to 8 mm. The particle sizes of particulates may have a multimodal distribution, such as bimodal or trimodal, or have four or five or more modes. One distribution of particles may be in the range of from about 3 mm to about 5 mm, having from about 10% to about 70%, alternatively from 20% to 35% of the total particles, another distribution may have from about 0.85 mm to about 2.4 mm, another distribution may have from about 0.40 mm to less than about 0.85 mm, having from about 10% to about 70%, alternatively from 20% to 35% of the total particles, another distribution of from about 0.210 mm to less than about 0.40 mm having from about 10% to about 70%, alternatively from 20 to 35% of the total particles, another distribution from about 0.100 to less than about 0.180 having from about 10% to about 70%, alternatively from 20% to 35% of the total particles, another distribution from about 0.070 to less than about 0.100 having from about 10% to about 70%, alternatively from 20% to 35% of the total particles, another distribution from 30 µm to 70 µm having from about 10% to about 70%, alternatively from 20% to 35% of the total particles.

Each of the above distributions may be included together, or the distributions may be arranged to include some distributions while not including others. For instance, larger particles from 3 to 5 mm and 0.40 to 0.85 may be included for plugging perforations or fractures. Alternatively such larger particles may be excluded, and instead smaller distributions having particle sizes less than 0.40 mm for use with smaller fractures, or microfractures, or to form a filter cake. The particle sizes and distributions may be modified depending on the wellbore, fractures, processes, and desired diversions.

Illustrated in FIG. 1 is an example nanocomposite of clay and urea. In particular, FIG. 1(a) shows an extruded nanocomposite in pellet form. FIG. 1(b) illustrates an exemplary magnification of urea particles dispersed in the clay matrix. In the presence of water or an aqueous fluid, the urea is at least partially dissolved causing degradation of the nanocomposite. The clay particles disassociate or disintegrate and may remain in the fractures as proppants or may flow back to the surface.

The rate of degradation of the composite may be controlled by varying the relative amounts of clay and urea. For instance, clay to the urea compound ranges from about 1:0.1 to about 1:10, alternatively from about 1:1 to about 1:20, alternatively from 1:1 to about 1:10, alternatively from 1:1 to about 1:5, alternatively about 1:2 to about 1:4 by weight, encompassing any value and subset therebetween.

Additionally, a polymer gelling agent may be added to the degradable diverter material, namely the nanocomposite, to slow and/or control the degradation time of the degradable material. The polymer gelling agent can be mixed and extruded with the clay and urea as part of the nanocomposite. The polymer gelling agent can be any water soluble polymer and/or water swellable polymer such as any saccharides such as guar, xanthan or diutan, as well as other water soluble polymers such as PVA, or polymers of acrylamides, acetates, esters, or other or any other natural/synthetic polymer that gels or thickens in water. The polymer gelling agent may act as an additional barrier between the nanocomposite and any aqueous fluid thereby inhibiting contact of water with urea. This may assist in lengthening the degradation time of the degradable diverter material. Moreover, inclusion of the polymer gelling agent may assist in storage of the degradable diverter material. Urea may be hygroscopic and so may absorb water at high humidity. Using the polymer gelling agent as an additive in the nanocomposite would help in controlling the hygroscopicity even when the material is stored at atmospheres with higher moisture content. The polymer gelling agent can be added from about 0 to 50%, alternatively from about 0 to 10%, alternatively from about 0.1% to 50%, alternatively from about 1% to 10%, encompassing any value and subset therebetween, the aforementioned values being a weight percentage. Addition of the polymer can increase the ratio of clay to urea.

Illustrative Diversion Processes

The degradable diverter material may be used to temporarily block the formation permeability and divert any fluid present downhole, including fluids already in the formation or wellbore, or any subterranean region, as well as any fluid injected from the surface.

The degradable diverter material may be employed in any process requiring diversion. Such processes may include fracturing, gravel packing, acid diversion, fluid loss control, conformance operations, scale control, water control, sand control, or any completion or stimulation processes. A particular process may include hydraulic fracturing. In such case the degradable diverter material may be pumped in separate stages before, during, after, or at the tail end of fracturing and proppant placement stages. For instance, a fracturing process may begin with a plurality of perforations being made in a vertical or horizontal well at one or more intervals in one or more zones. After the perforation stage, a fracturing stage can be carried out. For instance a treatment fluid may be injected at high pressure to cause fractures in the perforated regions or other regions in the well. A proppant may be injected with the treatment fluid during or after the fracturing stage. The degradable diverter material may be provided during these stages or after in order to divert fluid and block or reduce the formation permeability. The degradable material may agglomerate in the wellbore, perforation or fracture or pores of the formation to divert fluid downhole. This may be done by forming a filter cake on the surface of formation which diverts the incoming fluid to other untreated locations or prevents the loss of fluid. The degradable diverter material may also form a plug in the fractures or perforations. Upon plugging, an additional fracturing stage can be conducted whereby fluid is diverted by the degradable diverter material to pressurize and fracture other perforations or deepen other fractures.

The degradable diverter material may be mixed with a carrier fluid by mixing equipment and injected downhole. The carrier fluid may be the same as a treatment fluid from fracturing or any other process. The carrier fluid and treatment fluid may be water or an aqueous or water based fluid. The aqueous base fluid includes water, deionized water, water with trace elements, saltwater, seawater, brine, freshwater, and the like. The brine may be filtered brine or "clear brine."

After a treatment, or during well shut-in, the degradable diverter material, which may be a filter cake or a plug formed from nanocomposite particulate, may be in continuous, semi-continuous or occasional contact with the water based fluid from the surface or which may already be present downhole. Due to this contact with water, dissolution of urea from the composite occurs thereby causing degradation as discussed with respect to FIG. 1 above. Once a sufficient amount of urea dissolves in water, the remaining portion (including clay) will disintegrate or dissassociate and will be ready to flow back into the wellbore or act a proppant. When this disintegration happens at the formation face it may not hamper the permeability of the formation.

The degradable material may begin to degrade at temperatures above about 270° F. Accordingly, the degradable material may be employed in wells for temperatures from about 270° F. and below, for instance from about ambient temperatures to about 270° F., alternatively from about 20° F. to about 270° F.

Illustrations (1) Thermogravimetric Analysis

A thermogravimetry analysis was conducted to evaluate the thermal stability of clay and urea nanocomposite during thermal decomposition. The thermogravimetric (TG) and derivative thermogravimetric curves (DTG) are shown in FIGS. 2(a) and (b) respectively. The graphs provided in FIG. 2(a) and (b) illustrate data obtained during experimental analysis performed bv Pereira, et al., as indicated in their publication *Urea-Montmorillonite-Extruded Nanocomposites: A Novel Slow-Release Material*. As illustrated in FIG. 2 the ratios of clay to urea are 1:1, 1:2 and 1:4 along with urea and clay each shown alone. The graph of FIG. 2(a) illustrates weight percent versus temperature. The graph in FIG. 2(b) illustrates the same results as a derivative (dm/dT/a.u.) versus temperature, thereby showing the change in mass.

The results show significant decomposition for the nanocomposites and urea after ≈133° C., which ensures that the material is stable up to approximately 133° C. (270° F.). Notably, urea undergoes the most significant degradation whereas clay does not significantly degrade at any temperature. Since the temperature at which decomposition begins at about 270° F., the nanocomposite can be mixed and injected at ambient temperatures at the surface without issue, and then as the temperatures rise after injection downhole above 270° F. degradation may begin.

(2) Compression Test

A comparative analysis of the mechanical resistance of the synthesized material was performed by a diametral compression method and the results are captured in FIG. 3. Again, the ratios of clay to Urea of 1:1, 1:2 and 1:4 are tested, along with urea and clay alone, with the graph showing stress versus strain. As indicated with respect to FIG.2(a) and (b), the graph provided in FIG. 3 illustrates data obtained by Pereira, et al. The compression tests illustrate the plasticity of the degradable diverter material.

As observed in FIG. 3, the behavior of a pure urea is similar to that of a fragile material, with poor plasticity where it crushes at very low pressures. The same observation was noticed in the case of pure Montmorillonite clay. On the other hand, all of the nanocomposites were very deformable, without rupture even until the maximum deformation supported by the equipment. The said plasticity or deformability of the nanocomposite assists in its formation of a proper filter cake at higher pressures, by squeezing the material into to small fractures near the formation faces.

(3) Dissolution Analysis

Figure 4:
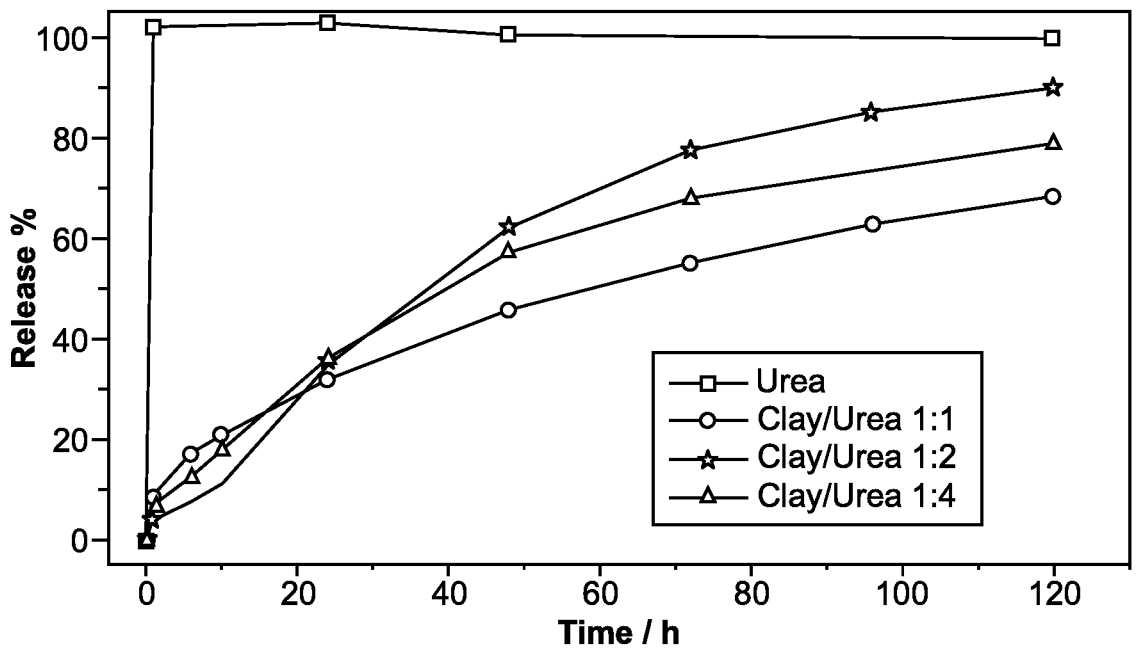
FIG. 4. is a graph illustrating a dissolution test of an example nanocomposite disclosed herein.

FIG. 4 shows the urea release for the three produced nanocomposites (clay:urea of 1:1, 1:2, and 1:4) compared to release for urea alone, as obtained by Perira, et al. The dissolution for urea alone occurred in <1 h, whereas the composites took more than 3-5 days for complete dissolution in water. The dissolution experiments were done with water of pH 7.

These results indicate there was no clear correlation between the total clay in the nanocomposite and the total urea released. In fact, the 1:1 formulation caused higher urea retention, but only small differences were observed using the 1:2 and 1:4 mixtures. This may mean that the effect of the clay in minor quantities is less considerable, but, in any case, it is notable that even those nanocomposites showed slower release when compared to pure urea.

Salt concentration and different temperatures may also affect decomposition and so may further be considered in designing of the ratios of the degradable diverter material based on different field conditions.

(4) Cost Analysis

In general, the cost of using conventional degradable diverter material such as polylactic acid (PLA) is much costlier than the one which we propose. The cost of PLA is about 3-8 $ per pound whereas the cost component required to manufacture the nanomaterials is about 0.6 $ per pound, this itself makes the system much cheaper.

TABLE 1

Cost analysis

| PLA based existing solution | | Proposed-urea based solution | |
| --- | --- | --- | --- |
| Material | Cost $/lb. | Material | Cost $/lb. |
| PLA | 3-8 | Urea | 0.2 |
| | | Clay | 0.2-0.4 |
| Total cost | 3-8 | Total cost | <0.6 |

The exemplary methods and compositions disclosed herein may directly or indirectly affect one or more components or pieces of equipment associated with the preparation, delivery, recapture, recycling, reuse, and/or disposal of the disclosed compositions. The degradable diverter material of the present disclosure can be employed in a wide variety of oil and gas and downhole applications, for example, as part of a hydraulic fracturing process. Although in the following figures and description, a fracturing process is described, the use of the presently disclosed composition is not limited to these applications but can be used in a wide variety of applications.

Figure 5:
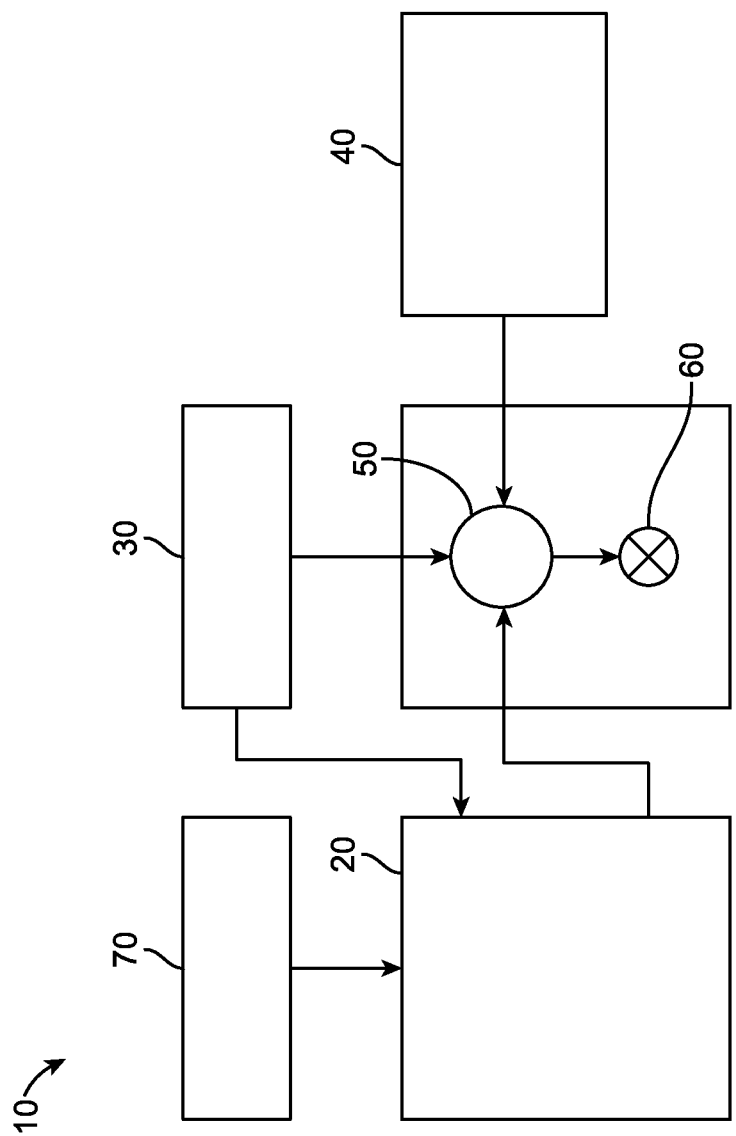
FIG. 5 is a diagram illustrating an example of a fracturing system that may be used in association with certain aspects of the present disclosure.
Figure 6:
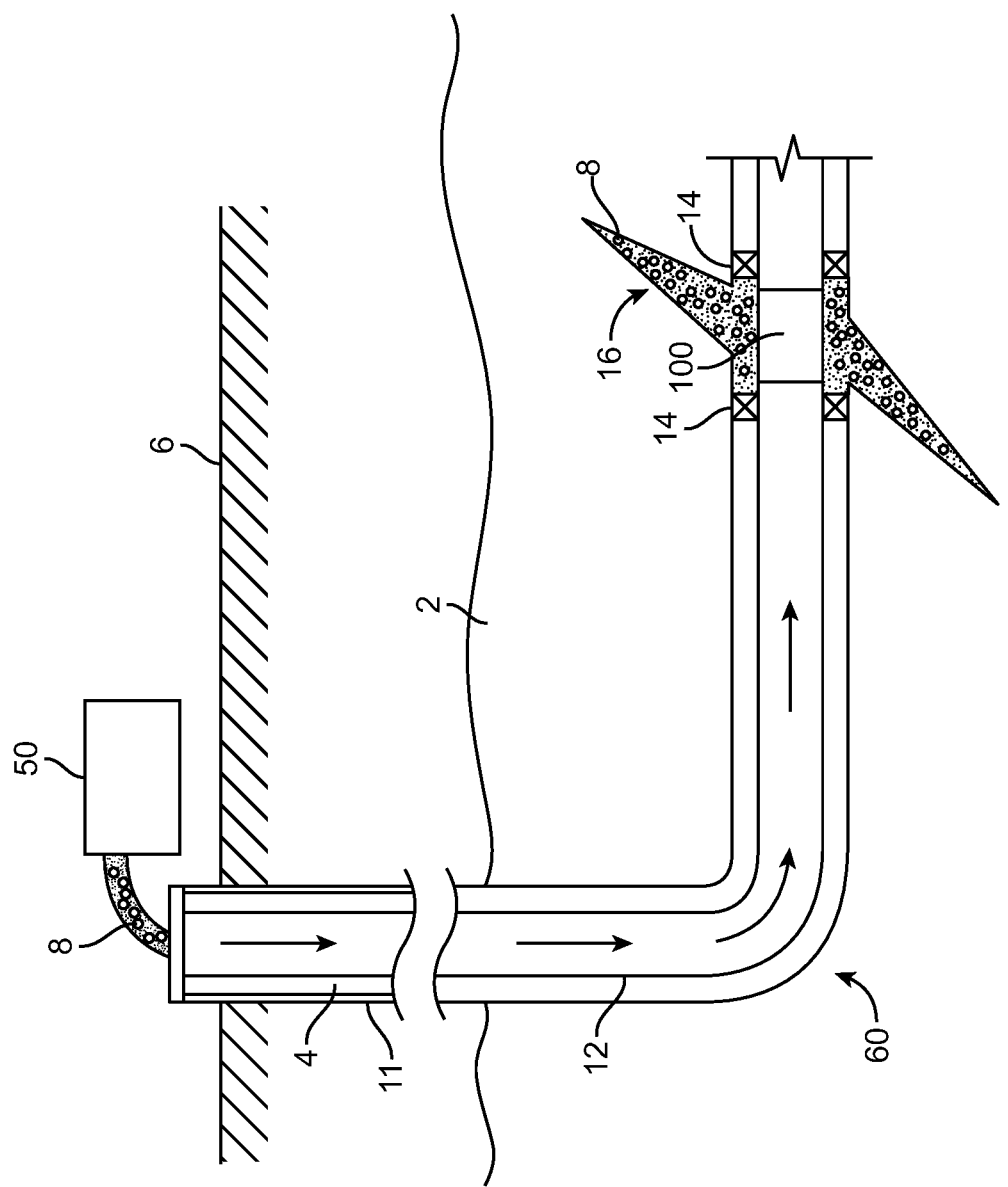
FIG. 6 is a diagram illustrating an example of a subterranean formation in which a fracturing operation may be performed in association with certain aspects of the present disclosure.

An exemplary fracturing system is illustrated in FIGS. 5 and 6. In this example, the system 10 includes a degradable diverter material 70. The degradable diverter material 70 may be the degradable nanocomposite particulate as described herein. The system 10 includes a mixing apparatus 20, a fluid source 30, a proppant source 40, and a pump and blender system 50 and resides at the surface at a well site where a wellbore 60 is located. The fluid source 30 may include the aqueous base fluid as disclosed herein. In certain instances, the mixing apparatus 20 combines the degradable diverter material 70 with the fluid source 30 which therefore serves as the carrier fluid for the degradable diverter material 70. In certain instances, the other components may be added such as a hydrocarbon fluid, a polymer gel, foam, air, nanoparticles, breakers, breaker, wet gases and/or other fluids and additives.

The pump and blender system 50 receives the binding composition and combines it with other components, including proppant from the proppant source 40 to form a treatment fluid, namely a fracturing fluid. Suitable proppants disclosed for the present disclosure may be any hard particulate that may prop open a fracture downhole, including any fine or coarse solid particles, gravel, sand, desert sand, beach sand, brown sand, white sand, ceramic beads, glass beads, bauxite, sintered bauxite, sized calcium carbonate, ceramic, gravel, glass, polymer materials, polytetrafluoroethylene materials, nut shell pieces, walnut shell fragments, cured resinous particulates having nut shell pieces, seed shell pieces, cured resinous particulates having seed shell pieces, fruit pit pieces, cured resinous particulates having fruit pit pieces, wood, composite particulates, and any combination thereof.

The resulting mixture may be pumped down the wellbore 60 and out through a downhole tool, such as tool 100 shown in FIG. 6, or through perforations or apertures of a casing or tubing, under a pressure sufficient to create or enhance one or more fractures in a subterranean zone, for example, to stimulate production of fluids from the zone. Notably, in certain instances, the binding composition producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids using continuous mixing or "on-the-fly" methods. Thus, for example, the pumping and blender system 50 can prepare and distribute the fracturing fluid to the target subterranean zone.

FIG. 6 illustrates a fracturing operation being performed on a portion of a subterranean formation of interest 2 surrounding a well bore 4 at wellbore 60. The well bore 4 extends from the surface 6, and the fracturing fluid 8 is applied to a portion of the subterranean formation 2 surrounding the horizontal portion of the well bore through, for example, a downhole tool 100. The tool 100 can include ports, holes, or a sleeve which permits exit of fluid from the work string 12. Alternative to the tool 100, the fracturing fluid 8 may be applied via perforations or other apertures in a casing 11 (when the casing extends that far), work string 12, other piping, or merely directly into the formation. Although shown as vertical deviating to horizontal, the well bore 4 may include horizontal, vertical, slant, curved, and other types of well bore geometries and orientations, and the fracturing treatment may be applied to a subterranean zone surrounding any portion of the well bore. The well bore 4 can include a casing 11 that is cemented or otherwise secured to the well bore wall. The well bore 4 can be uncased or include uncased sections. In cased wells, perforations can be formed using shape charges, a perforating gun, hydro-jetting, and/or other tools.

The well is shown with a work string 12 depending from the surface 6 into the well bore 4. The pump and blender system 50 is coupled to the work string 12 to pump the fracturing fluid 8 into the well bore 4. The work string 12 may include coiled tubing, jointed pipe, and/or other structures that allow fluid to flow into the well bore 4. The work string 12 can include flow control devices that control the flow of fluid from the interior of the work string 12 into the subterranean zone 2.

The work string 12 and/or the well bore 4 may include one or more sets of packers 14 that seal the annulus between the work string 12 and well bore 4 to define an interval of the well bore 4 into which the fracturing fluid 8 will be pumped. FIG. 6 shows two packers 14, one defining an uphole boundary of the interval and one defining the downhole end of the interval. When the fracturing fluid 8 is introduced into well bore 4 at a sufficient hydraulic pressure, one or more fractures 16 may be created in the subterranean zone 2. The proppant particulates in the fracturing fluid 8 may enter the fractures 16 where they may remain after the fracturing fluid flows out of the well bore. These proppant particulates may "prop" fractures 16 such that fluids may flow more freely through the fractures 16.

Figure 7A:
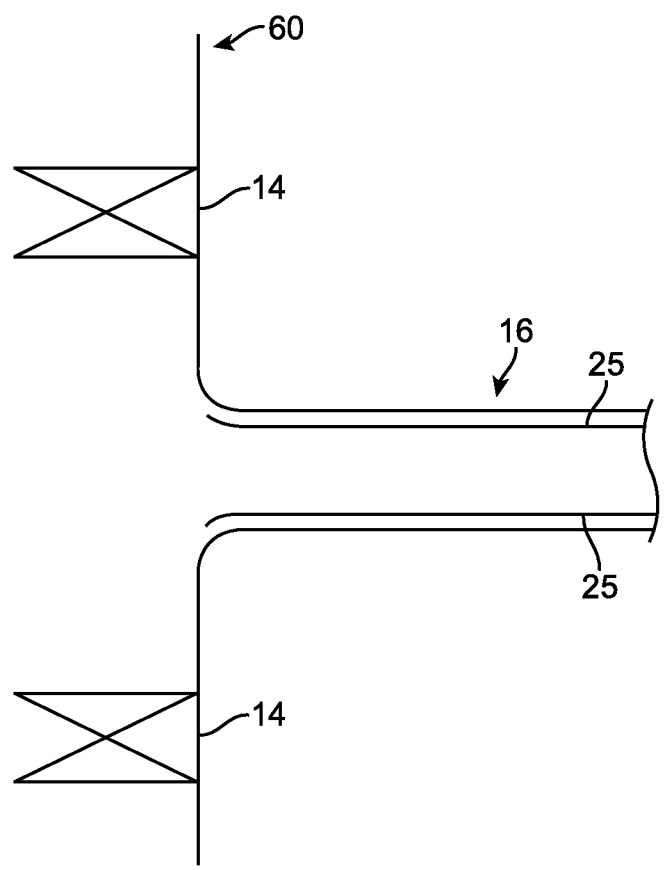
FIG. 7 is a diagram illustrating formation of a filter cake and plug using the degradable diverter material disclosed herein.
Figure 7B:
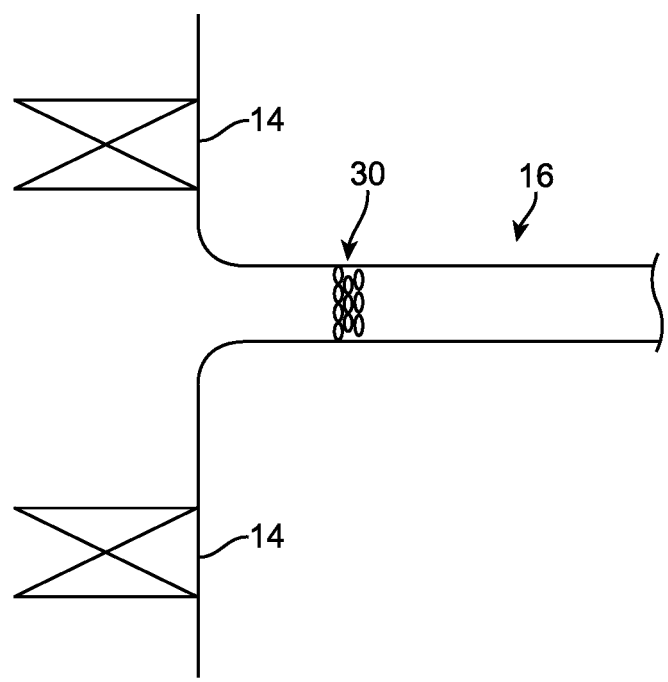

Before, during or after proppants have been injected as shown FIG. 6, the degradable diverter material 70 can be injected from the surface into the wellbore 60. As shown in FIG. 7, the degradable diverter material can agglomerate and form a diversion for fluid. As shown in FIG. 7(*a*), the degradable diverter material may form a filter cake 25 along the formation face of the fracture 16. This may serve to prevent fluid loss and may divert fluid from being lost into the formation. Alternatively, the degradable diverter material may form a plug 30 in the fracture 16. As shown a plurality of the degradable particulate (each particle being made of the nanocomposite) may bridge against one another and plug the fracture. In order to bridge, multiple modes of different size particles of the degradable particulate may be employed. Upon bridging, fluid may be diverted from the fracture 16 to other fractures or perforations in the same or different zones in order to fracture such other zones, fractures and perforations. By employing the degradable diverter material in this way, more than one layer of a multilayer formation may be subject to fracturing.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Statements of the Disclosure Include:

Statement 1: A method including introducing a degradable particulate into a wellbore penetrating a subterranean formation, the degradable particulate comprising a urea compound; allowing the degradable particulate to divert at least a portion of a fluid present downhole; and allowing the degradable particulate to at least partially degrade.

Statement 2: The method according to Statement 1, wherein the urea compound is urea or a urea derivative.

Statement 3: The method according to one Statement 2, wherein the urea compound is urea.

Statement 4: The method according any one of the preceding Statements 1-3, wherein each individual particle of the degradable particulate is a composite of the urea compound and a clay.

Statement 5: The method according to Statement 4, wherein the composite is a nanocomposite.

Statement 6: The method according any one of the preceding Statements 1-5, wherein the ratio of clay to the urea compound ranges from about 1:1 to about 1:20 by weight.

Statement 7: The method according any one of the preceding Statements 1-6, wherein the degradable particulate further comprises a polymer gelling agent.

Statement 8: The method according any one of the preceding Statements 1-7, wherein the polymer gelling agent is selected from the group consisting of polymers of saccharide, acrylamide, acetate, ester, and mixtures thereof.

Statement 9: The method according any one of the preceding Statements 1-8, wherein a breaker for the polymer gelling agent is introduced into the wellbore.

Statement 10: The method according any one of the preceding Statements 1-9, wherein the degradable particulate forms one or more of a plug or cake in a subterranean region to divert at least a portion of the fluid present downhole.

Statement 11: The method according any one of the preceding Statements 1-10, wherein the degradable particulate plugs at least one of a perforation or fracture.

Statement 12: The method according any one of the preceding Statements 1-11, wherein the degradable particulate is provided during hydraulic fracturing, wherein the hydraulic fracturing is provided to more than one layer of a multilayer formation.

Statement 13: The method according any one of the preceding Statements 1-12, wherein the degradable particulate substantially degrades in a time period ranging from about 2 hours to 6 days subsequent being introduced downhole.

Statement 14: The method according any one of the preceding Statements 1-13, wherein the fluid present downhole is an aqueous fluid.

Statement 15: The method according any one of the preceding Statements 1-14, wherein the degradable particulate is in the shape of one or more of a finely divided particulate, beads, chips, powder, granules, flakes, fiber, or mixtures thereof.

Statement 16: The method according any one of the preceding Statements 1-15, wherein the degradable particulate has a particle size distribution wherein at least 10% of the particles have a diameter of from 0.42 mm to 4 mm.

Statement 17: The method according any one of the preceding Statements 1-16, wherein the degradable particulate has a multimodal particle size distribution.

Statement 18: The method according any one of the preceding Statements 1-17, wherein the degradable particulate has a particle size distribution wherein at least 10% of the particles have a diameter of from 30 μm to 300 μm.

Statement 19: The method according any one of the preceding Statements 1-18, further comprising mixing the degradable particulate with a carrier fluid using mixing equipment before or during introduction into the wellbore.

Statement 20: The method according any one of the preceding Statements 1-19, wherein the carrier fluid is introduced into a subterranean formation using one or more pumps.

The invention claimed is:

1. A method comprising:
   forming a partially degradable particulate wherein each individual particle of the partially degradable particulate is a composite including a urea compound and a clay;
   pumping the partially degradable particulate into a wellbore penetrating a subterranean formation, wherein the partially degradable particulate forms an obstruction that diverts at least a portion of a fluid present downhole;

allowing the urea compound of the partially degradable particulate to at least partially degrade; and removing at least a first portion of the clay of the partially degradable particulate from the wellbore.

2. The method of claim 1 wherein the urea compound is urea or a urea derivative.

3. The method of claim 2, wherein the urea compound is urea.

4. The method of claim 1, wherein the composite is a nanocomposite formed by urea intercalated into the host clay structure.

5. The method of claim 1, wherein the ratio of clay to the urea compound ranges from about 1:1 to about 1:20 by weight.

6. The method of claim 1, wherein the partially degradable particulate further comprises a polymer gelling agent.

7. The method of claim 6, wherein the polymer gelling agent is selected from the group consisting of polymers of saccharide, acrylamide, acetate, ester, and mixtures thereof.

8. The method of claim 6, wherein a breaker for the polymer gelling agent is introduced into the wellbore.

9. The method of claim 1, wherein the partially degradable particulate forms one or more of a plug or cake in a subterranean region to divert at least a portion of the fluid present downhole.

10. The method of claim 1, wherein the partially degradable particulate plugs at least one of a perforation or fracture.

11. The method of claim 1, wherein the partially degradable particulate is provided during hydraulic fracturing, wherein the hydraulic fracturing is provided to more than one layer of a multilayer formation.

12. The method of claim 1, wherein the urea compound of the partially degradable particulate substantially degrades in a time period ranging from about 2 hours to 6 days subsequent being introduced downhole.

13. The method of claim 1, wherein the fluid present downhole is an aqueous fluid.

14. The method of claim 1, wherein the partially degradable particulate is in the shape of one or more of a finely divided particulate, beads, chips, powder, granules, flakes, fiber, or mixtures thereof.

15. The method of claim 1, wherein the partially degradable particulate has a particle size distribution wherein at least 10% of the particles have a diameter of from 0.42 mm to 4 mm.

16. The method of claim 1, wherein the partially degradable particulate has a multimodal particle size distribution.

17. The method of claim 1, wherein the partially degradable particulate has a particle size distribution wherein at least 10% of the particles have a diameter of from 30 μm to 300 μm.

18. The method of claim 1 further comprising mixing the partially degradable particulate with a carrier fluid using mixing equipment before or during introduction into the wellbore.

19. The method of claim 18, wherein the carrier fluid is introduced into a subterranean formation using one or more pumps.

20. The method of claim 1, wherein a second portion of the clay of the partially degradable particulate remains within the wellbore as a proppant in one or more fractures.

* * * * *